United States Patent
Dou et al.

(10) Patent No.: US 11,815,000 B2
(45) Date of Patent: Nov. 14, 2023

(54) EXHAUST GAS TREATMENT SYSTEM WITH IMPROVED LOW TEMPERATURE PERFORMANCE

(71) Applicant: Deere & Company, Moline, IL (US)

(72) Inventors: Danan Dou, Cedar Falls, IA (US); Eric J. Hruby, Waterloo, IA (US); Bryan T. Geisick, Cedar Falls, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 17/827,382

(22) Filed: May 27, 2022

(65) Prior Publication Data

US 2022/0290599 A1 Sep. 15, 2022

Related U.S. Application Data

(62) Division of application No. 16/007,489, filed on Jun. 13, 2018, now abandoned.

(51) Int. Cl.
*F01N 3/20* (2006.01)
*F01N 3/10* (2006.01)
*F01N 3/035* (2006.01)

(52) U.S. Cl.
CPC ........... *F01N 3/2066* (2013.01); *F01N 3/035* (2013.01); *F01N 3/106* (2013.01); *F01N 3/108* (2013.01); *F01N 3/2013* (2013.01); *F01N 3/2033* (2013.01); *F01N 2240/38* (2013.01); *F01N 2250/02* (2013.01); *F01N 2570/14* (2013.01);
(Continued)

(58) Field of Classification Search
CPC ............. F01N 2240/16; F01N 2240/38; F01N 2250/02; F01N 2560/06; F01N 2570/14; F01N 2570/18; F01N 2590/08; F01N 3/035; F01N 3/106; F01N 3/108; F01N 3/2013; F01N 3/2033; F01N 3/2066
See application file for complete search history.

(56) References Cited

U.S. PATENT DOCUMENTS 6,915,776 B2    7/2005  zur Loye et al.
2002/0172633 A1* 11/2002  Koermer ................ B01D 53/06
                                                  423/219
(Continued)

FOREIGN PATENT DOCUMENTS

JP   2006125382 A   5/2006
WO   2010000909 A1  1/2010

OTHER PUBLICATIONS

Tachibana et al., "Effect of Ozone on Combustion of Compression Ignition Engines," Combustion and Flame, 1991, 85:515-519.
(Continued)

*Primary Examiner* — Anthony Ayala Delgado
(74) *Attorney, Agent, or Firm* — Michael Best & Friedrich LLP

(57) ABSTRACT

A method of treating exhaust gas from an internal combustion engine as the exhaust gas passes through an exhaust gas pathway includes injecting reductant into the exhaust gas pathway with a reductant injector, filtering particulate matter from the exhaust gas with a first treatment element located downstream of the reductant injector, oxidizing soot on the first treatment element with ozone, and converting nitrogen oxides (NOx) from the exhaust gas with a second treatment element located downstream of the reductant injector.

14 Claims, 6 Drawing Sheets

(52) U.S. Cl.
CPC ...... *F01N 2570/18* (2013.01); *F01N 2590/08* (2013.01)

(56) References Cited

U.S. PATENT DOCUMENTS

| | | | |
|---|---|---|---|
| 2009/0235648 A1* | 9/2009 | Kakinohana | F01N 3/021 60/299 |
| 2013/0047583 A1 | 2/2013 | Driscoll et al. | |
| 2014/0000246 A1* | 1/2014 | Hosoya | F01N 3/08 60/286 |
| 2014/0150408 A1 | 6/2014 | Van Niekerk et al. | |
| 2015/0360177 A1* | 12/2015 | Tsumagari | C01B 13/11 422/177 |
| 2016/0265411 A1 | 9/2016 | Tsukamoto et al. | |
| 2016/0312678 A1 | 10/2016 | Siddhanthi et al. | |
| 2016/0346732 A1 | 12/2016 | Schmitt et al. | |
| 2017/0234184 A1 | 8/2017 | Norton et al. | |
| 2018/0058297 A1 | 3/2018 | Sharp | |
| 2018/0171850 A1 | 6/2018 | Aydin et al. | |

OTHER PUBLICATIONS

Yagyu et al., "Fundamental studies on effect of ozone injection to the internal-combustion engine—FTIR spectrum of hydrocarbon compound reformulated by ozone," J. Phys.: Conf. Ser., 2008, 100:062015.

English Translation of JP 2006125382 Odajima Sadao (Year: 2006).

\* cited by examiner

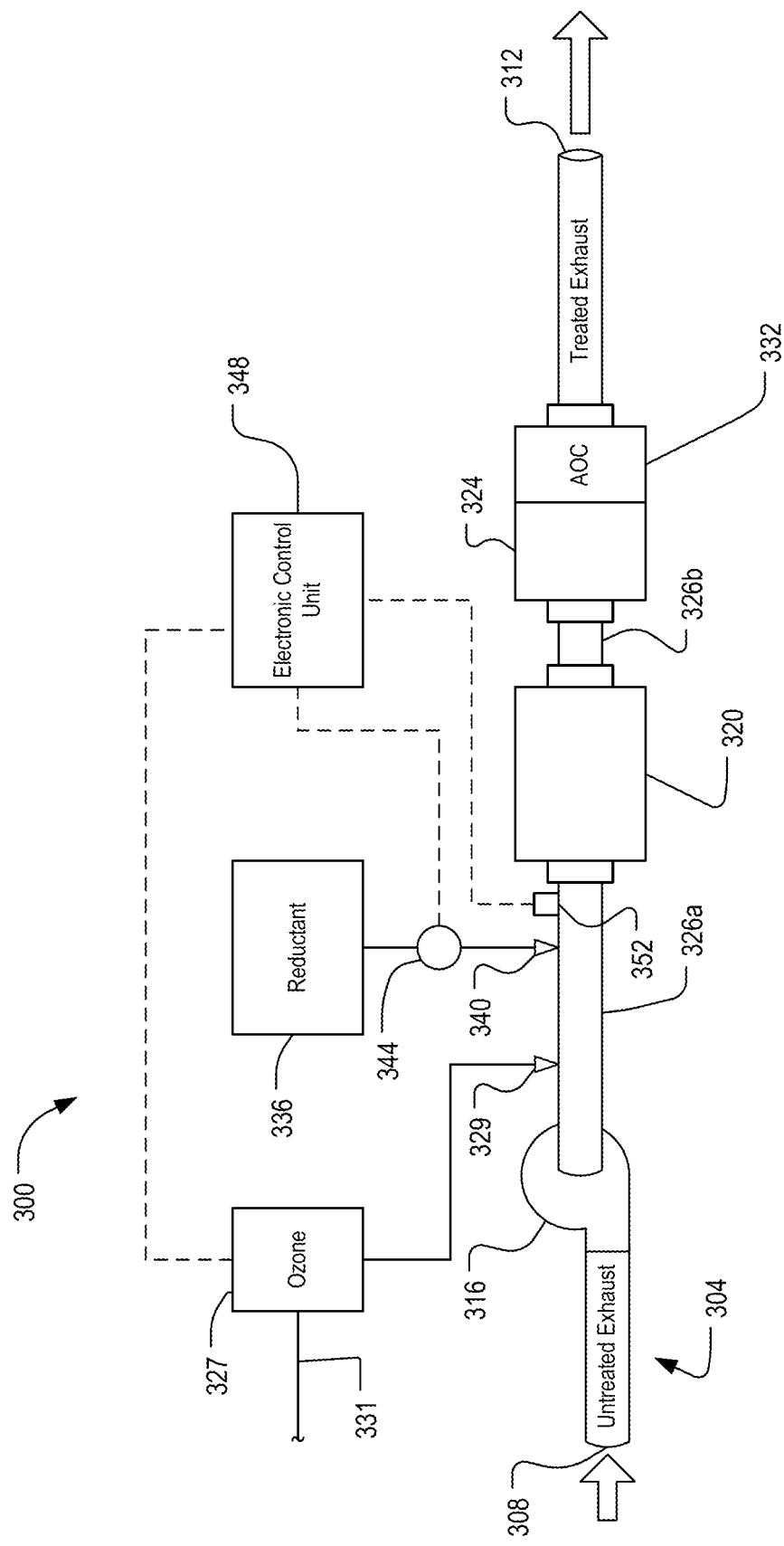

EXHAUST GAS TREATMENT SYSTEM WITH IMPROVED LOW TEMPERATURE PERFORMANCE

CROSS-REFERENCE TO RELATED APPLICATIONS

This application is a division of co-pending U.S. patent application Ser. No. 16/007,489, filed Jun. 13, 2018, the entire content of which is incorporated herein by reference.

BACKGROUND

The present disclosure relates to exhaust systems and more particularly to diesel exhaust gas treatment systems.

Diesel exhaust is typically subject to emissions regulations covering a variety of emission components, including particulate matter and nitrogen oxides ($NO_x$). A variety of exhaust treatment devices have been developed to reduce these emission components. For example, a diesel particulate filter (DPF) can be used to trap diesel particulate matter and oxidize soot, and a selective catalytic reduction (SCR) element can be used to convert the $NO_x$ present in exhaust gas into other compounds, such as nitrogen, water, and carbon dioxide. Typically, diesel exhaust fluid (DEF) is injected upstream of the SCR element to provide ammonia, which acts as a reducing agent and reacts with the $NO_x$ in the presence of the SCR catalyst. A selective catalytic reduction on filter (SCR+F) element combines SCR and DPF functionality such that $NO_x$ reduction and particulate matter filtration and oxidation can occur in a single element.

SUMMARY

A diesel oxidation catalyst (DOC) is typically provided upstream of a SCR and DPF or a SCR+F element. The DOC includes one or more precious group metals (e.g., platinum, palladium, etc.) that act as a catalyst to reduce emission of carbon monoxide, hydrocarbons, and volatile organic compounds. The DOC also oxidizes NO to $NO_2$, which promotes faster SCR reactions at exhaust temperatures above 250 degrees Celsius. However, at low temperatures (e.g., about 250 degrees Celsius or less) that occur during a cold start state of the engine, the DOC will consume $NO_2$ by reacting $NO_2$ with carbon monoxide and hydrocarbons in the exhaust gas. This reduces the efficacy of downstream SCR or SCR+F elements. The presence of the DOC also adds thermal mass to the exhaust gas treatment system, which delays warm-up of the SCR or SCR+F elements. Low temperature (i.e. cold start) performance is increasingly important as emissions regulations tighten. Finally, particles of the precious metal catalyst from the DOC may become entrained with the exhaust. These particles may travel with the exhaust and attach to the filtration media in a downstream DPF or SCR+F element. When ammonia is exposed to the precious metal particles trapped in the DPF or SCR+F element, the ammonia is oxidized by oxygen, reducing ammonia availability for $NO_x$ reduction. In addition, the ammonia itself may produce additional $NO_x$ when it is oxidized.

Despite these disadvantages, typical systems require a DOC to increase the content of $NO_2$ in the exhaust gas at elevated temperatures, which enhances passive soot oxidation and supports active regeneration of the downstream DPF or SCR+F. Accordingly, a need exists for an exhaust gas treatment system able to effectively oxidize soot on filter elements such as DPF or SCR+F elements, without use of an upstream DOC or other precious metal catalyst.

The present disclosure provides, in one aspect, a method of treating exhaust gas from an internal combustion engine as the exhaust gas passes through an exhaust gas pathway. The method includes injecting reductant into the exhaust gas pathway with a reductant injector, filtering particulate matter from the exhaust gas with a first treatment element located downstream of the reductant injector, oxidizing soot on the first treatment element with ozone, and converting nitrogen oxides ($NO_x$) from the exhaust gas with a second treatment element located downstream of the reductant injector.

The present disclosure provides, in another aspect, a method of treating exhaust gas from an internal combustion engine as the exhaust gas passes through an exhaust gas pathway, including injecting reductant into the exhaust gas pathway with a reductant injector, injecting ozone into the exhaust gas pathway with an ozone injector, filtering particulate matter from the exhaust gas with a first treatment element located downstream of the reductant injector and the ozone injector, oxidizing soot on the first treatment element with the ozone, converting nitrogen oxides ($NO_x$) from the exhaust gas with a second treatment element located downstream of the first treatment element, and supplying additional ozone into an air intake of the internal combustion engine.

The present disclosure provides, in another aspect, a method of treating exhaust gas from an internal combustion engine as the exhaust gas passes through an exhaust gas pathway, including injecting reductant into the exhaust gas pathway with a reductant injector, filtering particulate matter from the exhaust gas with a first treatment element located downstream of the reductant injector and the ozone injector, converting nitrogen oxides ($NO_x$) from the exhaust gas with a second treatment element located downstream of the first treatment element, determining whether the exhaust gas treatment system is in a cold operating state based on feedback from a sensor, and supplying the ozone into an air intake of the internal combustion engine when the exhaust gas treatment system is in the cold operating state.

Other features and aspects of the disclosure will become apparent by consideration of the following detailed description and accompanying drawings.

BRIEF DESCRIPTION OF THE DRAWINGS

FIG. 6 is a schematic diagram of an exhaust gas treatment system according to another embodiment.

Before any embodiments are explained in detail, it is to be understood that the disclosure is not limited in its application to the details of construction and the arrangement of components set forth in the following description or illustrated in the following drawings. The disclosure is capable of supporting other embodiments and of being practiced or of being carried out in various ways. Also, it is to be understood that the phraseology and terminology used herein is for the purpose of description and should not be regarded as limiting.

DETAILED DESCRIPTION

Figure 1:
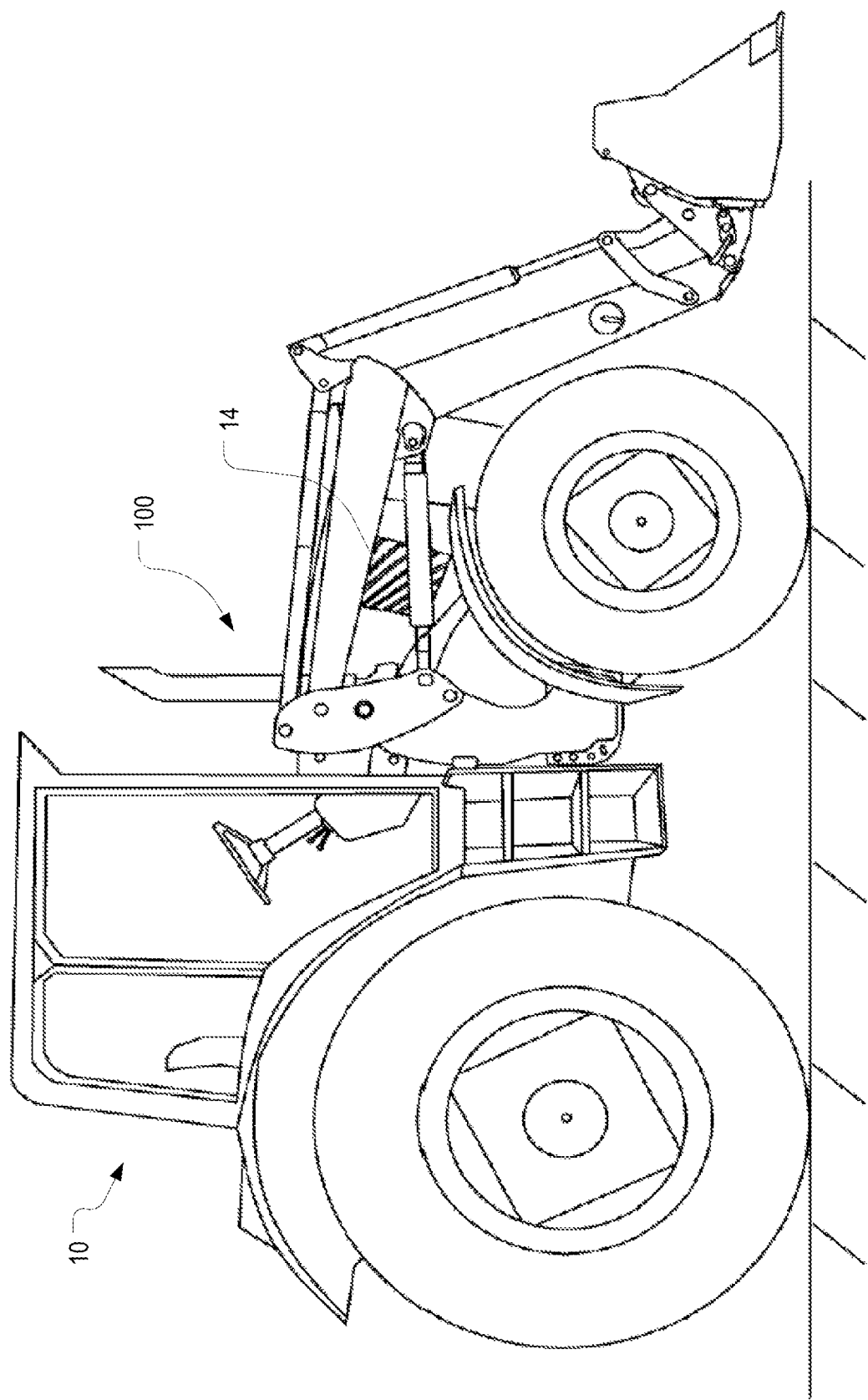
FIG. 1 is a side view of a vehicle in which the disclosed system and method for regulating exhaust emissions may be implemented.

FIG. 1 illustrates an exemplary vehicle 10 including a diesel-powered internal combustion engine 14 and an exhaust gas treatment system 100 according to one embodiment. The illustrated vehicle 10 is a utility tractor, but the exhaust gas treatment system 100 is not so limited in application and can be used in conjunction with any diesel-powered internal combustion engine. For example, the exhaust gas treatment system 100 can be used in other work vehicles, passenger vehicles, or other equipment powered by a diesel engine (e.g., generators, compressors, pumps, and the like).

Figure 2:
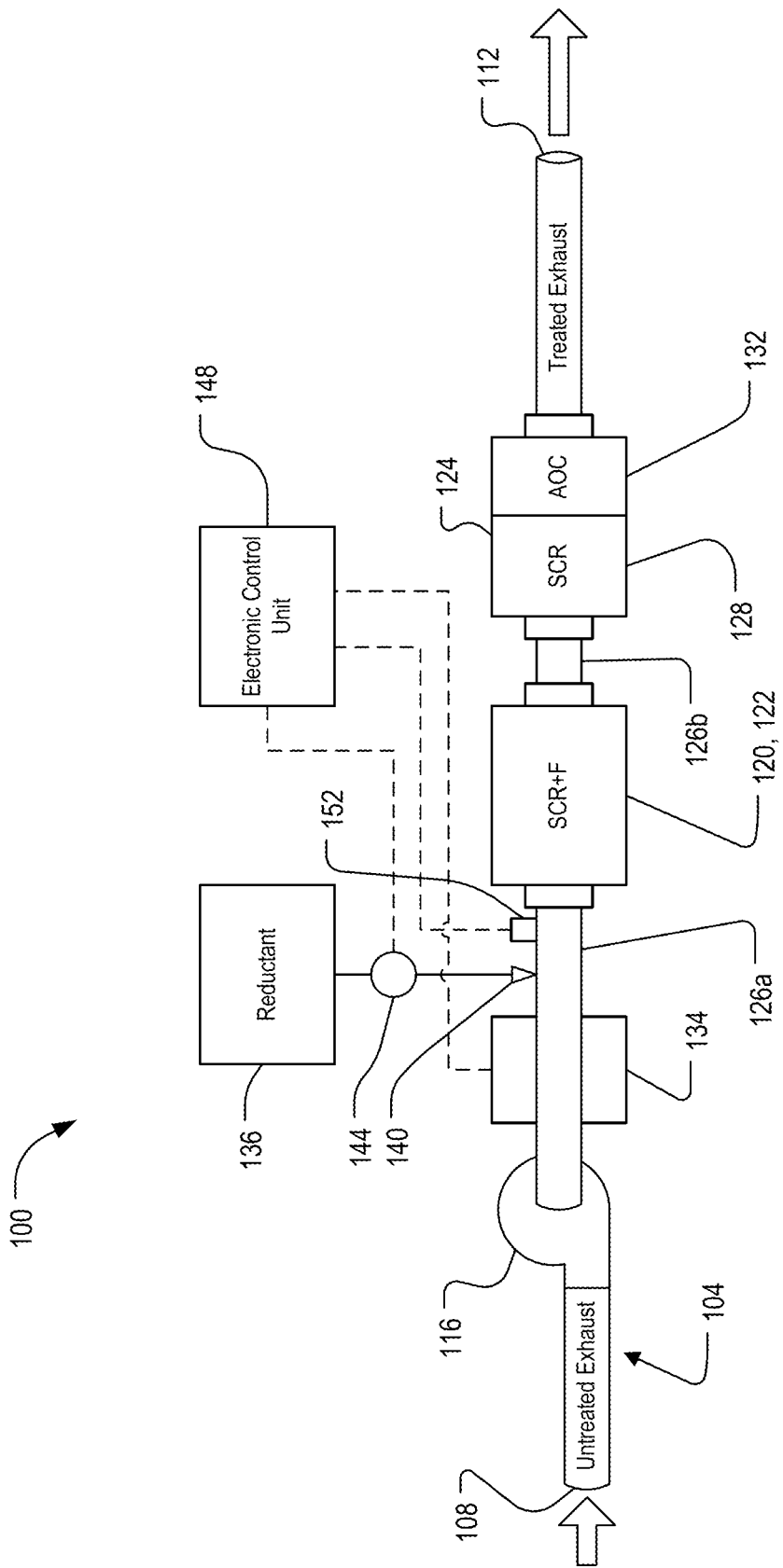
FIG. 2 is a schematic diagram of an exhaust gas treatment system according to one embodiment.

With reference to FIG. 2, the exhaust gas treatment system 100 includes an exhaust pathway 104 (e.g., an exhaust pipe) having an inlet or upstream side 108 and an outlet or downstream side 112. A turbocharger 116 is disposed in the exhaust pathway 104 proximate the inlet 108, but in alternative embodiments, the turbocharger 116 may be omitted. A first treatment element 120 and a second treatment element 124 are located in series along the exhaust pathway 104, between the inlet 108 and the outlet 112. Although the second treatment element 124 is located downstream of the first treatment element 120 in the illustrated embodiment, the numeric designations "first," "second," etc. are used herein for convenience and should not be regarded as defining order, quantity, or relative position. In addition, the illustrated first and second treatment elements 120, 124 are located downstream of the turbocharger 116; however, in other embodiments, the turbocharger 116 may be located between the first and second treatment elements 120, 124 or downstream of the treatment elements 120, 124.

A first transition pipe 126a couples the exhaust outlet of the turbocharger 116 and the first treatment element 116, and a second transition pipe 126b couples the first treatment element 120 and the second treatment element 124. The transition pipes 126a, 126b may define an outer diameter that is smaller than an outer diameter of one or both treatment elements 120, 124. Alternatively, the transition pipes 126a, 126b may define an outer diameter that is substantially the same as the outer diameter of the treatment elements 120, 124.

In the embodiment illustrated in FIG. 2, the first treatment element 120 includes a combined selective catalytic reduction and diesel particulate filter (SCR+F) element 122 with a catalytic washcoat and a porous filter substrate. The washcoat may include one or more metal catalysts, such as a copper-based catalyst, an iron-based catalyst, or a vanadium-based catalyst. Alternatively, other washcoats (e.g., zeolite-based) may be used. The first treatment element 120 captures particulate matter, oxidizes soot, and reduces $NO_x$ from exhaust gas passing through the first treatment element 120.

The second treatment element 124 in the illustrated embodiment includes a selective catalytic reduction (SCR) element 128 and an ammonia oxidation catalyst (AOC) 132. The SCR element 128 may include, for example, a catalytic washcoat on a monolithic support material, such as ceramic. The washcoat may include one or more metal catalysts, such as a copper-based catalyst, an iron-based catalyst, or a vanadium-based catalyst. Alternatively, other washcoats (e.g., zeolite-based) may be used. The SCR element 128 and the AOC 132 are positioned in series, with the AOC 132 located downstream of the SCR element 128. The SCR element 128 reduces $NO_x$ from exhaust gas passing through it. The AOC 132 converts excess ammonia leaving the SCR element 128 to nitrogen and water. In some embodiments, the AOC 132 may be provided as a separate treatment element positioned downstream of the second treatment element 124.

With continued reference to FIG. 2, the exhaust gas treatment system 100 includes a heater 134 configured to heat the exhaust gas as it passes through the exhaust pathway 104. In the illustrated embodiment, the heater 134 is positioned on the first transition pipe 126a, between the turbocharger 116 and the first treatment element 120 so as to heat the exhaust gas prior to the exhaust gas entering the first treatment element 120. In some embodiments, the heater 134 is a fuel burner that burns fuel (e.g., diesel fuel) drawn from a fuel tank of the engine 14 or from an auxiliary fuel tank. In other embodiments, the heater 134 is an electric heater with one or more electric heating elements powered via the electrical system of the vehicle 10.

The exhaust gas treatment system 100 further includes a reductant supply 136 and a reductant injector 140 in fluid communication with the reductant supply 136 via a distributor 144. The reductant supply 136 includes a reservoir for storing a reductant, such as diesel exhaust fluid (DEF) or ammonia. The distributor 144 can include one or more pumps, valves, and the like to selectively control the flow of reductant from the reductant supply 136 to the injector 140. The reductant injector 140 is positioned to introduce reductant into the first transition pipe 126a, downstream of the heater 134 and upstream of the first treatment element 120 (i.e. between the heater 134 and first treatment element 120). In other embodiments, the reductant injector 140 may be positioned upstream of the heater 134 to provide a greater distance between the injector 140 and the first treatment element 120 for mixing the injected reductant into the passing exhaust gas. In some embodiments, one or more flow affecting features (e.g., fins, vanes etc.) may be provided downstream of the reductant injector 140 to enhance mixing.

An electronic control unit (ECU 148) actively controls various aspects of the operation of the exhaust gas treatment system 100. A sensor 152, which is a temperature sensor in the illustrated embodiment, is disposed proximate the first treatment element 120. The sensor 152 may be a thermistor, thermocouple, resistance temperature detector, infrared sensor, or any other sensor suitable for measuring the temperature of exhaust gas. All or a portion of the temperature sensor 152 may extend into the exhaust pathway 104 so as to be directly exposed to exhaust gas. Alternatively, the temperature sensor 152 may be located outside the exhaust pathway 104 and measure the temperature of the exhaust gas indirectly (e.g., by measuring the temperature of the exhaust pipe).

The sensor 152 is communicatively coupled to the ECU 148 to provide feedback to the ECU 148 indicative of an operating state of the exhaust gas treatment system 100. For example, in the illustrated embodiment, the temperature sensor 152 provides feedback indicative of whether the exhaust gas treatment system 100 is in a cold operating state (e.g., after cold starting the engine 14 or when operating in very cold ambient conditions). In some embodiments, one or more additional sensors may be provided to monitor various other parameters of the exhaust gas treatment system 100. These sensors may monitor, for example, $NO_x$ concentrations, ammonia concentrations, temperature, exhaust flow rate, pressure, and/or ash loading at one or more points along the exhaust pathway 104 and provide feedback to the ECU 148 indicative of the performance of the exhaust gas treatment system 100.

Figure 3:
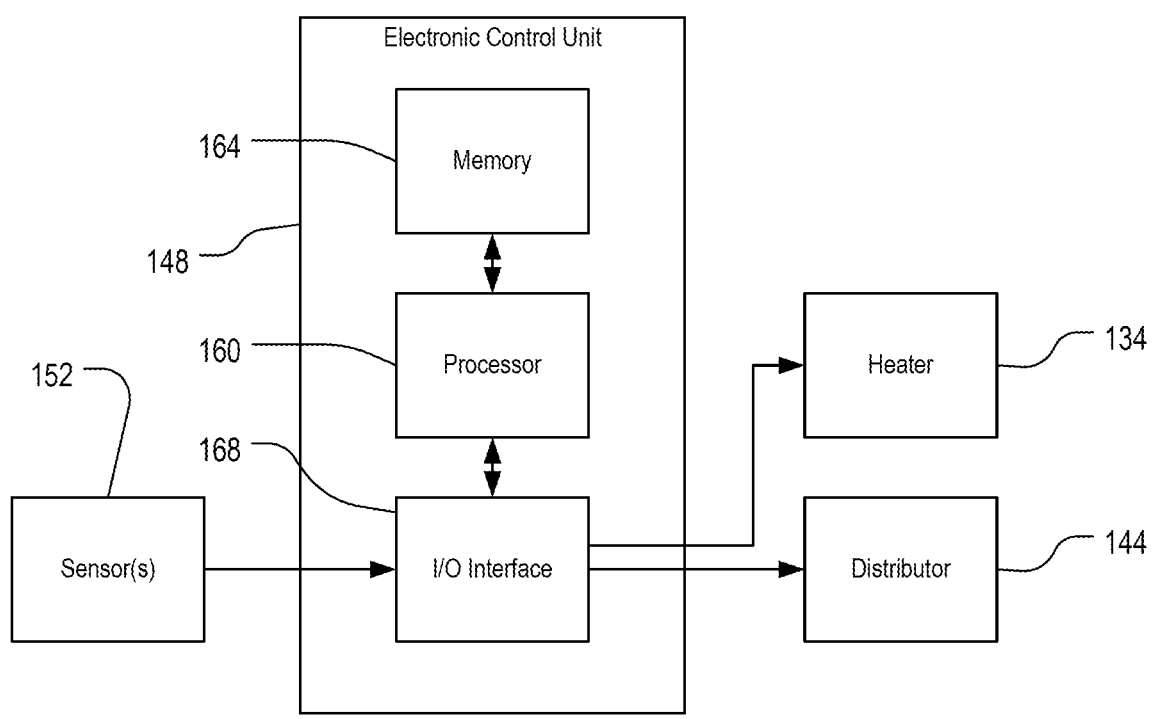
FIG. 3 is a block diagram of an electronic control unit of the exhaust gas treatment system of FIG. 2.

FIG. 3 illustrates an example of the ECU 148 for control of the exhaust gas treatment system 100. The ECU 148 includes a plurality of electrical and electronic components that provide power, operational control, and protection to the components and modules within the ECU 148. In particular, the ECU 148 includes, among other things, an electronic processor 160 (e.g., a programmable microprocessor, microcontroller, or similar device), non-transitory, machine-readable memory 164, and an input/output interface 168. The electronic processor 160 is communicatively coupled to the memory 164 and configured to retrieve from memory 164 and execute, among other things, instructions related to the control processes and methods described herein. In other embodiments, the ECU 148 includes additional, fewer, or different components. In the illustrated embodiment, the ECU 148 is communicatively coupled to the sensor 152, the heater 134, and the distributor 144. The ECU 148 may also be configured to communicate with external systems including, for example, engine controls and/or vehicle controls.

In operation, untreated exhaust from the internal combustion engine 14 (FIG. 1) is directed into the exhaust pathway 104 at the inlet 108 (FIG. 2). The exhaust then flows through the turbocharger 116, which turns a compressor to feed compressed air back to the engine 14. After flowing through the turbocharger 116, the exhaust gas flows past the heater 134 and toward the first treatment element 120, which includes the SCR+F element 122 in the embodiment of FIG. 2. The ECU 148 commands the distributor 144 to supply reductant to the injector 140. The mixture of reductant and exhaust then enters the first treatment element 120. The reductant reacts with $NO_x$ in the presence of the catalyst of the SCR+F element 122 to form nitrogen and water, while soot is captured on the porous filter substrate. The partially treated exhaust then enters the second treatment element 124, where the reductant reacts with any remaining $NO_x$ in the SCR portion 128, and any unreacted reductant is subsequently oxidized in the AOC portion 132. The treated exhaust then exits the exhaust gas treatment system 100 through the outlet 112.

The ECU 148 may receive feedback from one or more $NO_x$ sensors and modulate the distributor 144 accordingly in order to maintain a target level of $NO_x$ and/or reductant (e.g., ammonia) downstream of the first treatment element 120. The ECU 148 also monitors feedback from the temperature sensor 152 to determine the operating state of the exhaust gas treatment system 100. If the sensor 152 indicates that the temperature of the exhaust gas proximate the first treatment element 120 is below a predetermined threshold value, the ECU 148 determines that the system 100 is in a cold operating state and activates the heater 134. The heater 134 heats the exhaust gas, which facilitates SCR reactions and reactions between $NO_2$ in the exhaust gas and soot collected on the filter substrate of the SCR+F element 122. The heater 134 thus promotes soot oxidation on the SCR+F element 122 and enhances $NO_x$ reduction on demand, without requiring a diesel oxidation catalyst or other precious metal catalyst upstream of the first treatment element 120. Since there is no precious metal catalyst upstream of the first treatment element 120, precious metal accumulation on the filter substrate of the SCR+F element 122 is eliminated.

In some embodiments, the ECU 148 may also periodically initiate an active regeneration process in which the ECU 148 activates the heater 134 to heat the exhaust gas to a temperature of at least about 550 degrees Celsius, and preferably to about 600 degrees Celsius or higher. Heating the exhaust gas to a sufficiently elevated temperature promotes active soot oxidation with oxygen. The ECU 148 may initiate the active regeneration process in response to an operator command, a time-based parameter, or in response to other monitored parameters of the exhaust gas treatment system 100.

Figure 4:
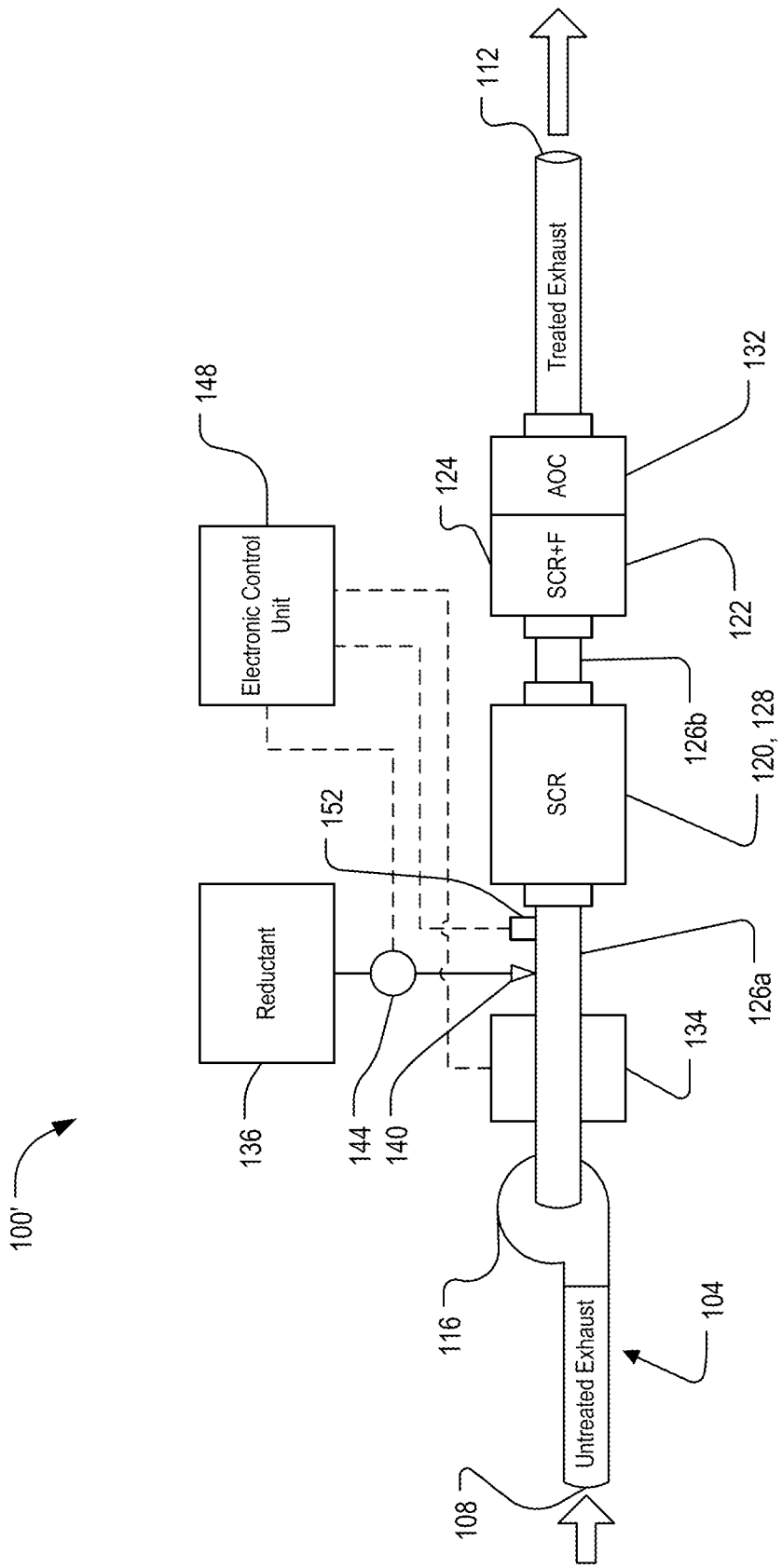
FIG. 4 is a schematic diagram of an exhaust gas treatment system according to another embodiment.

FIG. 4 illustrates an exhaust gas treatment system 100' according to another embodiment. In the illustrated embodiment, the positions of the SCR+F element 122 and the SCR element 128 are reversed. In other words, the first treatment element 120 includes the SCR element 128, and the second treatment element 124 includes the SCR+F element 122. The exhaust gas treatment system 100' operates in a similar manner as the exhaust gas treatment system 100 described above with reference to FIG. 2; however, soot filtration and oxidation occurs in the second treatment element 124 rather than the first 120.

Figure 5:
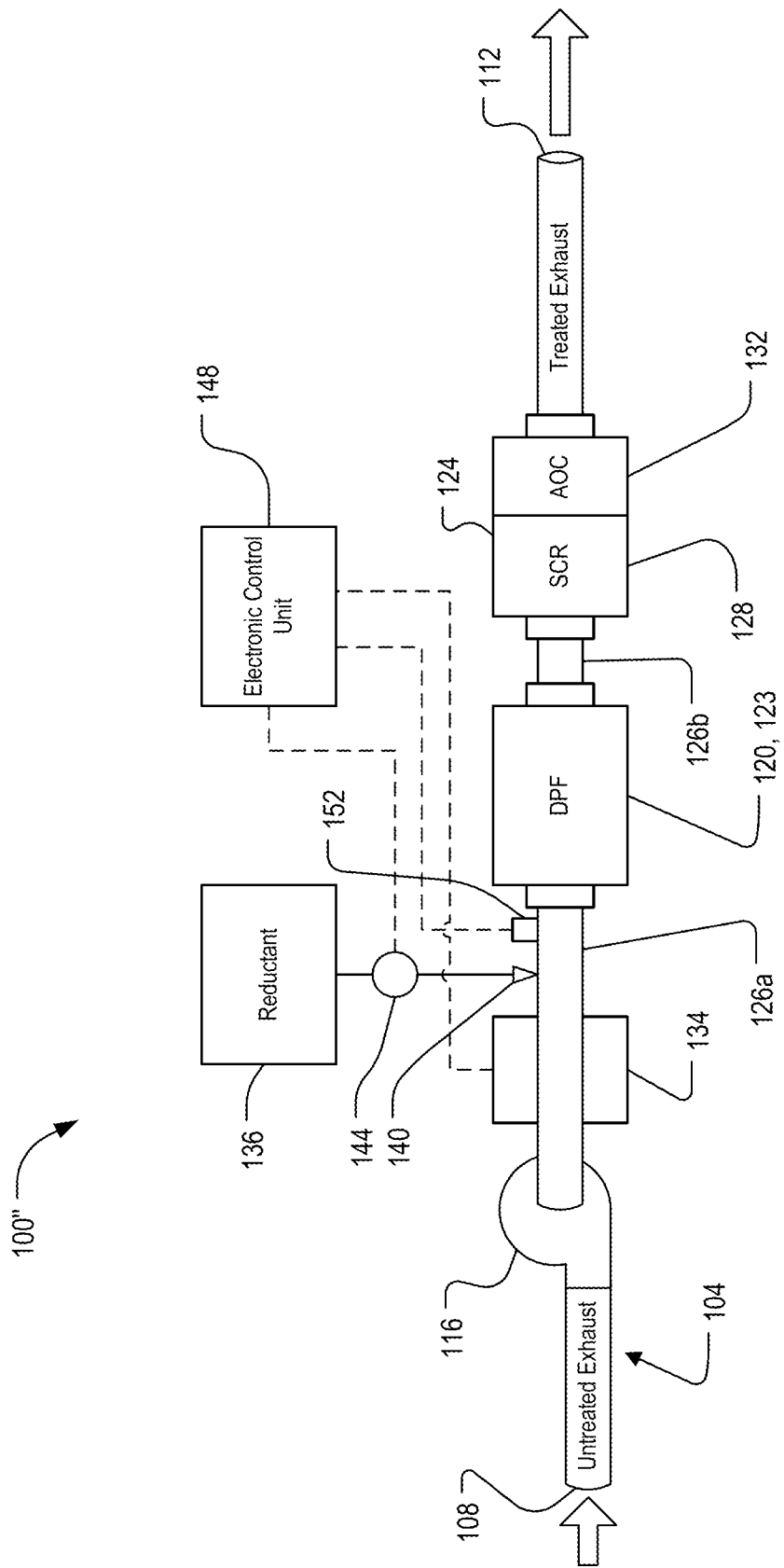
FIG. 5 is a schematic diagram of an exhaust gas treatment system according to another embodiment.

FIG. 5 illustrates an exhaust gas treatment system 100" according to another embodiment. The exhaust gas treatment system 100" is similar to the exhaust gas treatment system 100 described above with reference to FIG. 2, except that the SCR+F element 122 is replaced by a diesel particulate filter (DPF) 123 with a porous filter substrate able to capture particulate matter and oxidize soot from the exhaust gas. In such embodiments, the SCR element 128 of the second treatment element 124 is sized to handle the entire $NO_x$ load from the engine 14.

FIG. 6 illustrates an exhaust gas treatment system 300 according to another embodiment. The exhaust gas treatment system 300 is similar to the exhaust gas treatment system 100 described above with reference to FIG. 2, and features and elements of the exhaust gas treatment system 300 corresponding with features and elements of the exhaust gas treatment system 100 are given like reference numerals plus 200. In addition, the following description focuses on the differences between the exhaust gas treatment system 300 and the exhaust gas treatment system 100.

The exhaust gas treatment system 300 includes an exhaust pathway 304 (e.g., an exhaust pipe) having an inlet or upstream side 308 and an outlet or downstream side 312. A turbocharger 316 is disposed in the exhaust pathway 304 proximate the inlet 308. A first treatment element 320 and a second treatment element 324 are located in series along the exhaust pathway 304, between the inlet 308 and the outlet 312. A first transition pipe 326a couples the exhaust outlet of the turbocharger 316 and the first treatment element 320, and a second transition pipe 326b couples the first treatment element 320 and the second treatment element 324. The system 300 further includes a reductant supply 336, a reductant injector 340, and a distributor 344.

As described above with reference to FIGS. 2, 4, and 5, the first treatment element 320 may include a SCR+F element, a SCR element, or a DPF. The second treatment element 324 may include a SCR element or a SCR+F element, along with an AOC 332. In some embodiments, the AOC 332 may be provided as a separate treatment element positioned downstream of the second treatment element 324.

The exhaust gas treatment system 300 replaces the heater 134 (FIG. 2) with an ozone generator 327 and an ozone injector 329 configured to selectively inject ozone produced by the ozone generator 327 into the exhaust gas pathway 304 (FIG. 6). In the illustrated embodiment, the ozone injector 329 is positioned to inject ozone between the turbocharger 316 and the first treatment element 320 (i.e. upstream of the first treatment element 320). The ozone injector 329 is also positioned upstream of the reductant injector 340. Alternatively, the ozone injector 329 may be positioned downstream of the reductant injector 340. In some embodiments, the ozone generator 327 may be disposed within the exhaust pathway 304 and the ozone injector 329 may be omitted.

The introduction of ozone into the exhaust gas enhances soot oxidation at lower temperatures. For example, the presence of ozone allows for active regeneration at a temperature below 600 degrees Celsius and, in some embodiments, below 550 degrees Celsius. Because soot oxidation in the first or second treatment elements 320, 324 can occur at lower temperatures in the presence of ozone, the exhaust gas treatment system 300 is particularly suited for use with vanadium-based catalysts in the first and/or second treatment elements 320, 324. Vanadium-based catalysts are relatively low in cost and have a high resistance to sulfur poisoning when compared to other SCR and SCR+F catalyst materials but may degrade at temperatures in excess of about 550 degrees Celsius. In other embodiments, the first and/or second treatment elements 320, 324 may include other types of catalysts, such as iron-based or copper-based catalysts.

The ozone generator 327 is preferably powered by the electrical system of the vehicle 14 and can generate ozone via any suitable method, such as via corona discharge or ultraviolet light. The ozone generator 327 is configured to supply ozone on demand to the ozone injector 329. Ozone may additionally be supplied from the ozone generator 327 via a transfer line 331 to an air intake of the engine 14. It has been found that introducing ozone into the air intake of a diesel engine improves cold start performance and reduces misfiring. One or more valves, compressors, or other fluid transfer components may be provided along the transfer line 331 to regulate the flow of ozone to the engine air intake. These fluid transfer component(s) may be coupled to the ECU 348 for automatic control.

The ozone generator 327 is communicatively coupled to an ECU 348, which controls the injection of ozone into the exhaust pathway 304 (and, in some embodiments, into the engine air intake). The ECU 348 actively controls various aspects of the operation of the exhaust gas treatment system 300. A sensor 352, which is a temperature sensor in the illustrated embodiment, is disposed proximate the first treatment element 320 to provide feedback to the ECU 348 indicative of an operating state of the exhaust gas treatment system 300.

In operation, the ECU 348 monitors feedback from the temperature sensor 352 to determine the operating state of the exhaust gas treatment system 300. If the sensor 352 indicates that the temperature of the exhaust gas proximate the first treatment element 320 is below a predetermined threshold value, the ECU 348 determines that the system 300 is in a cold operating state and activates the ozone generator 327. The ozone promotes soot oxidation on the filter substrate in the first or second treatment elements 320, 324, without requiring a heater or a diesel oxidation catalyst or other precious metal catalyst upstream of the first treatment element 320. The ECU 348 also controls the distributor 344 to achieve desired $NO_x$ reduction via the first and/or second treatment elements 320, 324. As the exhaust gas leaves the second treatment element 324, the AOC 332 oxidizes any reductant that remains in the exhaust gas. The AOC 332 also advantageously reacts with any remaining ozone present in the exhaust gas to prevent the emission of ozone into the environment.

In some embodiments, the ECU 348 may also periodically initiate an active regeneration process in which the ECU 348 activates the ozone generator 327 to initiate an active regeneration process in response to an operator command, a time-based parameter, or in response to other monitored parameters of the exhaust gas treatment system 300.

Various features of the disclosure are set forth in the following claims.

What is claimed is:

1. A method of treating exhaust gas from an internal combustion engine as the exhaust gas passes through an exhaust gas pathway, the method comprising:
   generating ozone with an ozone generator, the ozone generator in fluid communication with an air intake of the internal combustion engine and with an ozone injector; supplying ozone from the ozone generator into the air intake;
   injecting reductant into the exhaust gas pathway with a reductant injector;
   filtering particulate matter from the exhaust gas with a first treatment element located downstream of the reductant injector;
   injecting ozone from the ozone generator into the exhaust gas pathway upstream of the first treatment element with the ozone injector;
   oxidizing soot on the first treatment element with ozone;
   converting nitrogen oxides ($NO_x$) from the exhaust gas with a second treatment element located downstream of the reductant injector
   determining whether the exhaust gas treatment system is in a cold operating state based on feedback from a sensor; and
   activating the ozone generator when the exhaust gas treatment system is in the cold operating state.

2. The method of claim 1, wherein the sensor is a temperature sensor.

3. The method of claim 1, wherein the first treatment element includes a combined selective catalytic reduction and diesel particulate filter (SCR+F) element or a diesel particulate filter (DPF).

4. The method of claim 3, wherein the exhaust gas treatment system does not include a precious metal catalyst upstream of the first treatment element.

5. The method of claim 4, wherein the second treatment element includes an SCR element.

6. The method of claim 5, further comprising reacting any remaining ozone in the exhaust gas with an ammonia oxidation catalyst positioned downstream of the SCR element of the second treatment element.

7. The method of claim 3, wherein oxidizing soot on the first treatment element occurs at a temperature less than 550 degrees Celsius via an active regeneration reaction.

8. The method of claim 1, wherein the first treatment element includes a Vanadium-based catalyst.

9. A method of treating exhaust gas from an internal combustion engine as the exhaust gas passes through an exhaust gas pathway, the method comprising:
   injecting reductant into the exhaust gas pathway with a reductant injector;
   injecting ozone into the exhaust gas pathway with an ozone injector;
   filtering particulate matter from the exhaust gas with a first treatment element located downstream of the reductant injector and the ozone injector;
   oxidizing soot on the first treatment element with the ozone;
   converting nitrogen oxides ($NO_x$) from the exhaust gas with a second treatment element located downstream of the first treatment element;

determining whether the exhaust gas treatment system is in a cold operating state based on feedback from a sensor; and supplying additional ozone into an air intake of the internal combustion engine when the exhaust gas treatment system is in the cold operating state.

10. The method of claim 9, wherein the sensor is a temperature sensor.

11. The method of claim 9, wherein the exhaust gas treatment system does not include a precious metal catalyst upstream of the first treatment element.

12. The method of claim 9, further comprising reacting any remaining ozone in the exhaust gas with an ammonia oxidation catalyst positioned downstream of the second treatment element.

13. The method of claim 9, wherein oxidizing soot on the first treatment element occurs at a temperature less than 550 degrees Celsius via an active regeneration reaction.

14. A method of treating exhaust gas from an internal combustion engine as the exhaust gas passes through an exhaust gas pathway, the method comprising:

injecting reductant into the exhaust gas pathway with a reductant injector;

filtering particulate matter from the exhaust gas with a first treatment element located downstream of the reductant injector and the ozone injector;

converting nitrogen oxides ($NO_x$) from the exhaust gas with a second treatment element located downstream of the first treatment element;

determining whether the exhaust gas treatment system is in a cold operating state based on feedback from a sensor; and supplying the ozone into an air intake of the internal combustion engine when the exhaust gas treatment system is in the cold operating state.

* * * * *